United States Patent
Bondalapati et al.

(10) Patent No.: US 11,272,377 B1
(45) Date of Patent: Mar. 8, 2022

(54) SITE SURVEY FOR WIRELESS BASE STATION PLACEMENT

(71) Applicant: Meta Platforms, Inc., Menlo Park, CA (US)

(72) Inventors: Pratheep Bondalapati, Woodland Hills, CA (US); Abhishek Tiwari, Oak Park, CA (US); Rohan Ramakrishnan, Fremont, CA (US); Duong Pham, Sherman Oaks, CA (US); Julius Kusuma, Fremont, CA (US); Farbod Tabatabai, San Francisco, CA (US); Ali Yazdan, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 145 days.

(21) Appl. No.: 16/798,307

(22) Filed: Feb. 22, 2020

(51) Int. Cl.
| | |
|---|---|
| H04W 16/18 | (2009.01) |
| H04W 16/28 | (2009.01) |
| H04L 27/26 | (2006.01) |
| H04B 7/06 | (2006.01) |
| H04B 7/08 | (2006.01) |

(52) U.S. Cl.
CPC .......... *H04W 16/18* (2013.01); *H04B 7/0617* (2013.01); *H04B 7/086* (2013.01); *H04L 27/2636* (2013.01); *H04W 16/28* (2013.01)

(58) Field of Classification Search
CPC ..... H04B 7/086; H04B 7/0617; H04W 16/28; H04L 27/2636
See application file for complete search history.

(56) References Cited

U.S. PATENT DOCUMENTS

| | | | |
|---|---|---|---|
| 6,141,566 A | 10/2000 | Gerdisch et al. | |
| 6,353,600 B1 | 3/2002 | Schwartz et al. | |
| 6,397,062 B1 | 5/2002 | Sessions | |
| 6,888,512 B1 | 5/2005 | Daigler | |
| 8,290,551 B2 * | 10/2012 | Landesman | H01Q 1/1257 455/575.7 |
| 8,774,837 B2 * | 7/2014 | Wright | G08G 1/0965 455/456.3 |
| 10,524,134 B1 | 12/2019 | Bondalapati et al. | |

(Continued)

OTHER PUBLICATIONS

U.S. Appl. No. 16/364,083, Response to Office Action dated Sep. 4, 2019.

*Primary Examiner* — Tejis Daya
(74) *Attorney, Agent, or Firm* — Brian R. Short (57) ABSTRACT

Apparatuses, methods, and systems for surveying a site are disclosed. One method includes transmitting, by a ground unit, wireless signals while a directionally adjustable beam-forming antenna of the ground unit changes a beam direction of the transmission of the wireless signals to N beam directions, wherein the directionally adjustable beam-forming antenna includes a known motion, receiving and measuring, by an elevated unit, a magnitude and phase of the wireless signals transmitted by the ground unit through the N beam directions, determining N complex receive power representations wherein each complex receive power representation includes the measured magnitude and phase of the received wireless signals corresponding with each of the N beam directions, and determining a receive power summation comprising performing a complex summation of the N complex receive power representations.

20 Claims, 8 Drawing Sheets

(56) References Cited

U.S. PATENT DOCUMENTS

| | | | |
|---|---|---|---|
| 2004/0136342 A1* | 7/2004 | Pedersen | H04W 28/16 370/335 |
| 2006/0040624 A1* | 2/2006 | Lipka | H03F 3/24 455/114.3 |
| 2006/0084474 A1 | 4/2006 | Iacono et al. | |
| 2006/0141929 A1 | 6/2006 | Lockie et al. | |
| 2009/0273517 A1* | 11/2009 | Thiesen | H01Q 3/2605 342/372 |
| 2010/0311353 A1* | 12/2010 | Teillet | H01Q 21/08 455/84 |
| 2013/0235807 A1 | 9/2013 | Lee et al. | |
| 2013/0278464 A1* | 10/2013 | Xia | H01Q 3/36 342/430 |

* cited by examiner

Standard Base Station
Cell Deployment

Wireless Tower with High-
Gain Antennas

Transmitting, by a ground unit, wireless signals while a directionally adjustable beam-forming antenna of the ground unit changes a beam direction of the transmission of the wireless signals to N beam directions, wherein the directionally adjustable beam-forming antenna includes a known motion that includes the directionally adjustable beam-forming antenna changing directions at a predetermined rate and each of N beam directions being uniformly separated from each other

810

Receiving and measuring, by an elevated platform, a magnitude and phase of the wireless signals transmitted by the ground unit through the N beam directions

820

Determining N complex receive power representations wherein each complex receive power representation includes the measured magnitude and phase of the received wireless signals corresponding with each of the N beam directions

830

Determining a receive power summation comprising performing a complex summation of the N complex receive power representations

SITE SURVEY FOR WIRELESS BASE STATION PLACEMENT

FIELD OF THE DESCRIBED EMBODIMENTS

The described embodiments relate generally to wireless communications. More particularly, the described embodiments relate to systems, methods and apparatuses for surveying a site for wireless base station placement.

BACKGROUND

Large populations around the world lack access to mobile broadband coverage. Typically, these uncovered populations live in remote rural areas of the world characterized by sparse population density, rugged terrain, lack of proper electricity or road infrastructure, low average revenue per user, demand uncertainty due to lack of device access.

Conventional mobile networks typically place base stations on 30-40 meters standard height towers. Providing coverage to large rural regions through the conventional approach requires several standard height towers and base stations. This makes conventional mobile network infrastructure deployment a very costly ordeal. The combination of high cost result in zero or negative return on investments for the network infrastructure owners and operators Site evaluation is a critical step in cellular base station deployments. This evaluation provides insights on the propagation model, inter-site/cell interference, co-channel interference etc. specific to the intended deployment location.

Conventional mobile networks typically place base stations on 30-40 meters standard height towers. To pace with these network operators, several drive testing and cell planning service companies possess well established tools to conduct the necessary site survey and RF parameters evaluation.

However, elevating base stations to greater heights above ground provides improved propagation (ranges of 20-75 km) and presents an opportunity to reduce the total cost of ownership for the network infrastructure operator by deploying fewer elevated base stations to cover the same area. Elevated units include (but not limited to) tall towers, aerostats, drones, high-rise buildings and mountains.

Improved propagation range provided by an elevated base station requires the base station to serve greater capacity to satisfy the demand. Elevating base stations well above the surrounding local clutter reduces the angular spread (power azimuth angular spectrum) observed at the base station. Low angular spread opens up opportunity for high order sectorization (HOS) to meet the capacity demands of an elevated base station One of the bottlenecks network operators face in attempting high-elevation deployments is the lack of site survey equipment for larger dimensions (ranges of 20-75 km) of cell coverage. The site survey companies are not yet motivated and geared to conduct R&D to resolve the challenges imposed by these tooling requirements.

It is desirable to have methods, apparatuses, and systems for surveying a site for wireless base station placement.

SUMMARY

An embodiment includes a method of surveying a site. The method includes transmitting, by a ground unit, wireless signals while a directionally adjustable beam-forming antenna of the ground unit changes a beam direction of the transmission of the wireless signals to N beam directions, wherein the directionally adjustable beam-forming antenna includes a known motion that includes the directionally adjustable beam-forming antenna changing directions at a predetermined rate and each of N beam directions being uniformly separated from each other, receiving and measuring, by an elevated unit, a magnitude and phase of the wireless signals transmitted by the ground unit through the N beam directions, determining N complex receive power representations wherein each complex receive power representation includes the measured magnitude and phase of the received wireless signals corresponding with each of the N beam directions, and determining a receive power summation comprising performing a complex summation of the N complex receive power representations.

Another embodiment includes a site survey tool. The site survey tool includes a ground unit, an elevated unit, and a controller. The ground unit operates to transmit wireless signals while a directionally adjustable beam-forming antenna of the ground unit changes a beam direction of the transmission of the wireless signals to N beam directions, wherein the directionally adjustable beam-forming antenna includes a known motion that includes the directionally adjustable beam-forming antenna changing directions at a predetermined rate and each of N beam directions being uniformly separated from each other. The elevated unit operates to receive and measure a magnitude and phase of the wireless signals transmitted by the ground unit through the N beam directions. The controller operates to determine N complex receive power representations wherein each complex receive power representation includes the measured magnitude and phase of the received wireless signals corresponding with each of the N beam directions, and determine a receive power summation comprising performing a complex summation of the N complex receive power representations.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for surveying a site for wireless base station placement. Specifically, at least some embodiments include surveying a site to determine whether the site would benefit from the deployment of a base station that includes a high-gain antenna, such as, a supercell base station that is taller and covers a substantially greater area than a conventional cellular base station. For at least some embodiments, a supercell base station refers to a long range, high capacity cellular base station mounted on a high elevation platform. For at least some embodiments, the surveying includes evaluating wireless signal propagation and power azimuth angular spectrum (PAS). That is, the surveying assesses the propagation and power azimuth angular spectrum metrics prior to, for example, investing in high-elevation long range cellular base stations.

For at least some embodiments, the power azimuth angular spectrum (PAS) for a receiver is defined as a set of angular components of the received signal expressed as power received in various azimuth angles of arrival. Similarly, for at least some embodiments, the PAS for a transmitter is defined as a set of angular components of the transmitted signal expressed as power radiated in various azimuth angles of departure.

Figure 1:
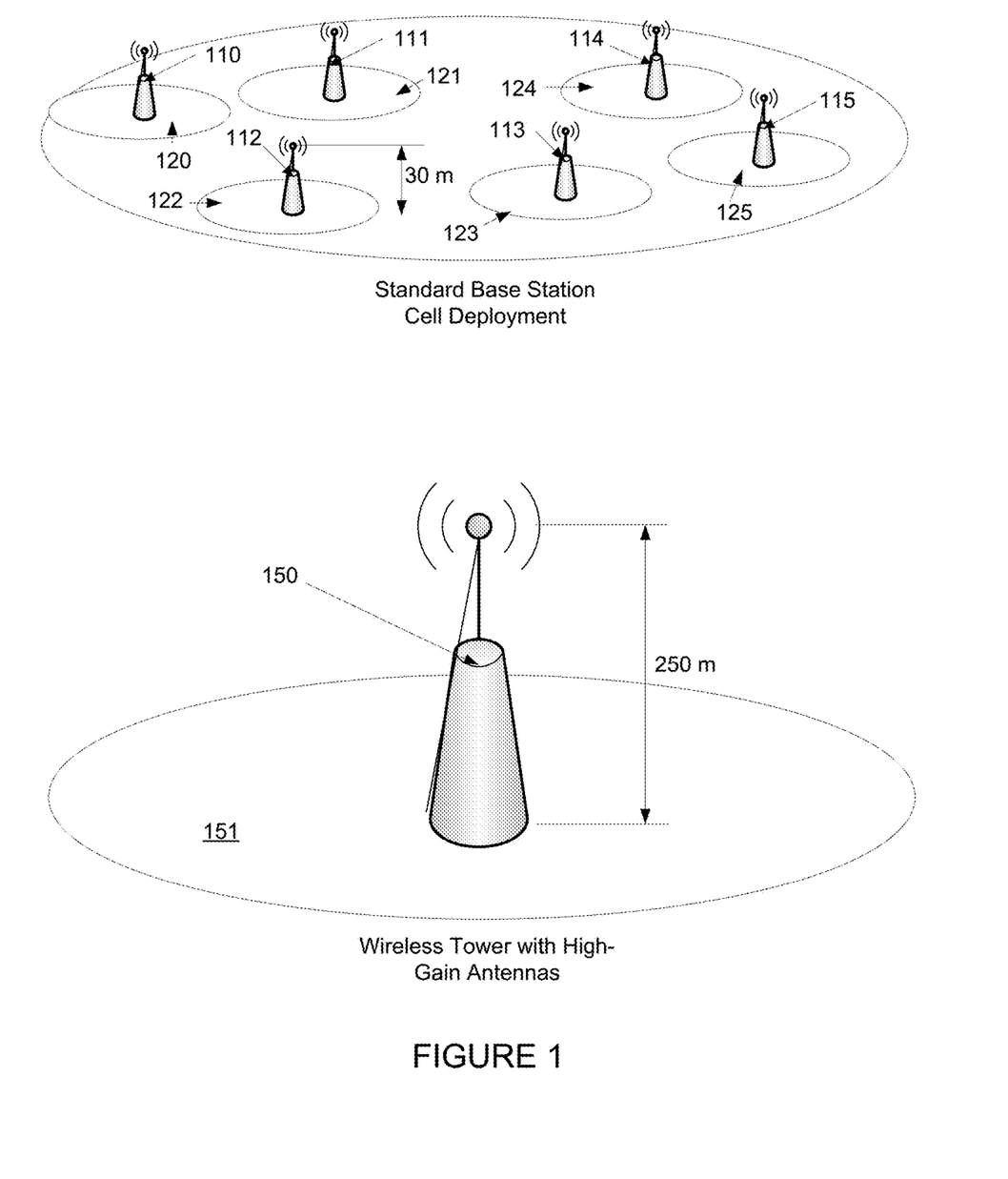
FIG. 1 shows a conventional base station tower and a high-gain antenna base station tower, according to an embodiment.

FIG. 1 shows conventional base station towers and a supercell base station tower, according to an embodiment. For an embodiment, the standard base stations 110, 111, 112, 113, 114, 115, have a height, and therefore, an antenna elevation of about 30 meters. Further, each of the standard base stations 110, 111, 112, 113, 114, 115, has a cell coverage area 120, 121, 122, 123, 124, 125.

FIG. 1 also shows a super cell base station tower 150 that has a coverage area 151. Elevating base stations to greater heights above ground provides improved propagation (ranges of 20-75 km) and presents an opportunity to reduce the total cost of ownership for the network infrastructure operator by deploying fewer elevated base stations to cover the same area. Further, improved propagation (coverage) range provided by an elevated base station requires the base station to serve greater capacity to satisfy the demand.

For at least some embodiments, the super cell base station tower 150 maintains a high-gain beamforming antenna that is elevated higher than antennas of standard cells. Further, due in part to the larger coverage footprint realized through the elevated beamforming antenna, the super cell base station tower 150 is operable to support higher data capacity that standard cells. For an embodiment, the super cell base station tower 150 utilizes adaptive high-order sectorization. At least some of the described embodiments include surveying sites to determine a level of power azimuth angular spectrum to determine whether the surveyed sites can support adaptive high-order sectorization by determining whether the power azimuth angular spectrum is lower than a threshold. If during the site survey, the power azimuth angular spectrum is determined to be less than a threshold amount, then site is determined to be able to support a super cell base station tower that utilizes the adaptive high-order sectorization.

For greater capacity, the spectral efficiency of the elevated base station 150 is needed since available spectrum is unlikely to change. Techniques such as Massive MIMO (multiple-input, multiple-output), MU-MIMO (multi-user, MIMO) and high order sectorization have been used to improve spectral efficiency. However, the performance of Massive MIMO and MU-MIMO techniques depend greatly on having good quality channel state feedback available at the base station. To obtain the channel state information, channel state estimation preambles are transmitted without the beamforming gain of MU-MIMO through an omni-directional antenna. However, this means that the propagation range of the base station is fundamentally limited by the range of omni-directional transmission of channel state preambles. Further, the capacity gains of highly sectorized base stations are greatly diluted if the base station is mounted on a standard height tower. The dilution is due to local clutter around the tower creates a large power azimuth angular spectrum which results in significant inter-sector interference between sectors. For an embodiment, a site is surveyed to determine whether the power azimuth angular spectrum of wireless signals within the site are below a threshold, and therefore, that the site can support a large (supercell) base station.

Deployment of tall (supercell) base stations is advantageous because cellular propagation models predict ~6 dB lower path loss upon each doubling of base station height. Further, for an embodiment, as the base station height increases, the clutter if power azimuth angular spectrum of wireless signals decreases. The reduction in the amount of clutter of the power azimuth angular spectrum of communication signals can make adaptive sectoring possible as oppose to short base station that typically suffer from too much cluster of the power azimuth angular spectrum of communication signals to allow for adaptive sectoring.

Site evaluation is a critical step in cellular base station (BTS) deployments. This assessment provides insights on the propagation model, inter-site/cell interference, co-channel interference etc. specific to the intended deployment location. A coverage estimate can then be provided based on conventional cell planning tools.

Conventional mobile networks typically place base stations on 30-40 meters standard height towers with fairly wide-beam antennas (58 degree 3-dB beam width and a gain of 18 dB). Due to the popularity of this equipment setup in the cellular industry, several drive testing and cell planning service companies possess well established tools to conduct the necessary site survey and RF parameters evaluation geared towards this setup.

As previously described, higher-order sectorization (HOS) is a widely known concept to increase the spectral efficiency of the BTS by increasing the frequency reuse within the site i.e. more than 3-sectors. To enable this feature, however, antenna patterns are required to have smaller beam width than the conventional 3-sector antennas.

Another application of HOS in rural deployments includes elevated BTS which provide improved propagation range which requires the BTS to serve greater capacity to satisfy user demands. Elevating the base stations well above the surrounding local clutter reduces the angular spread observed at the base station. Low angular spread opens up opportunity for HOS to meet the capacity demands of an elevated base station.

Although operators typically conduct a post-deployment site-survey, a survey using continuous-wave (CW) signal is a useful procedure prior to any network deployment to predict the coverage of the deployed network.

Figure 2A:
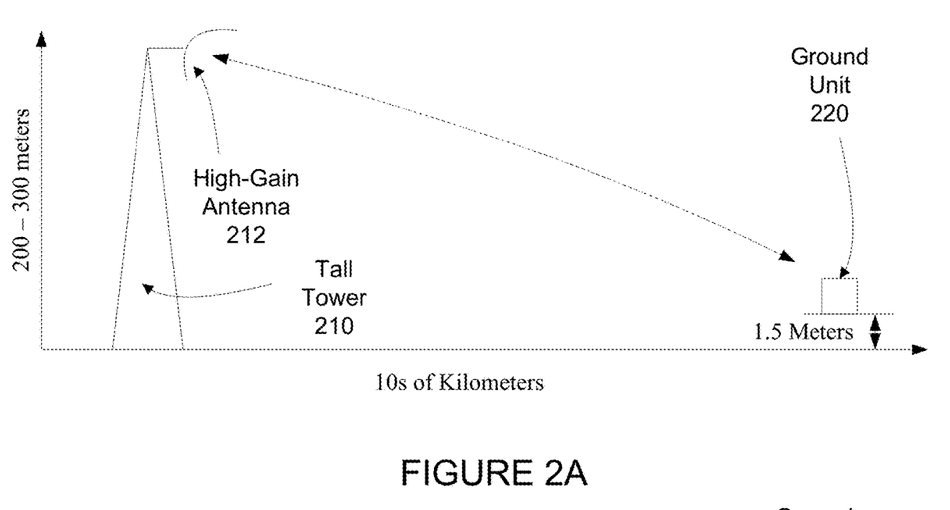
FIG. 2A shows a site survey configuration that includes a tall tower that includes a high-gain antenna, and a ground unit, according to an embodiment.

FIG. 2A shows a site survey configuration that includes a tall tower 210 that includes a high-gain antenna 212, and a ground unit 220, according to an embodiment. For this embodiment, the tall tower 210 is taller (for example, 200-300 meters) than a typically base station. For at least some embodiments, the high-gain antenna 212 is very heavy. The high-gain, however, is needed because using, for example, an 18-dBi antenna enables site-survey at much longer distances (up to 10 kms). However, a downside is the high-gain antenna typically weighs about 10 kgs and requires a firm mount (such as a tower) structure to obtain stable path loss measurements. Further, the weight of a high-power transmitter accompanying the high-gain antenna adds further to the overall weight of the payload hosted. Further, site-survey measurements typically need a high-power transmitter, in the order of 50 Watts. As a result, the necessary heatsink weight grows with the output power requirement further adding to the weight.

For the reasons described, the equipment (high-gain antenna, high-power transmitter) used by the site-survey companies are too heavy to be hosted on a temporary infrastructure such as aerostats or drones. Further, turbulence of these platforms influences the path loss measurements. Therefore, a tower structure is a must in order to support the equipment at high elevations. This type of a site survey (as shown in FIG. 2A) does not provide the freedom of optimal placement of a tower.

Figure 2B:
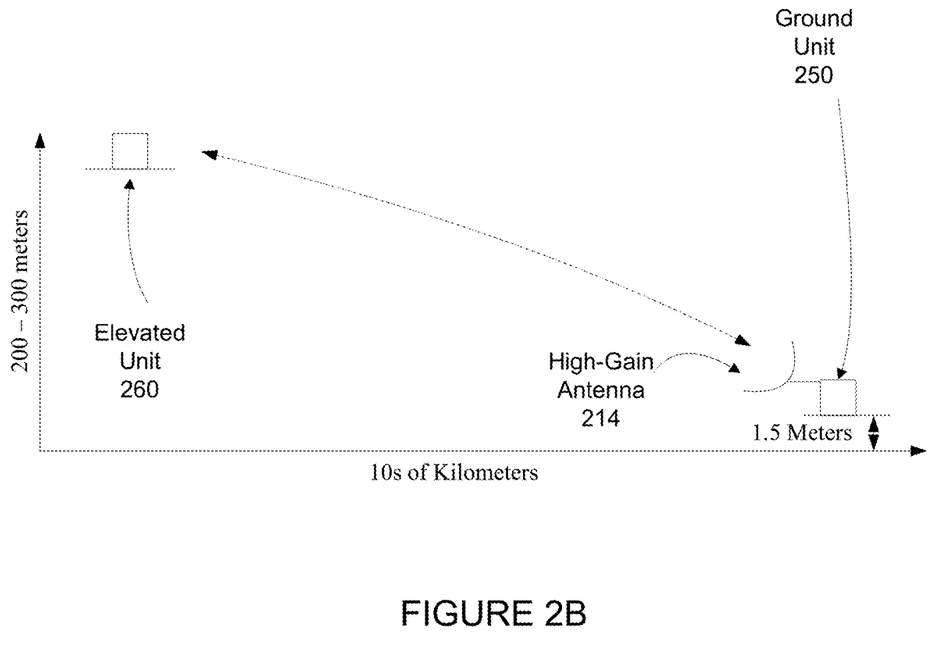
FIG. 2B shows a site survey configuration that includes an elevated unit, and a ground unit that includes a high-gain antenna, according to an embodiment.

FIG. 2B shows a site survey configuration that includes an elevated unit 260, and a ground unit 250 that includes a high-gain antenna 214, according to an embodiment. For at least some embodiments, the elevated unit 260 includes an omni-directional antenna and a power measurement device mounted underneath, for example, an aerial platform. For an embodiment, a two-axis gimballed high-gain dish antenna is affixed to the ground unit 250 which is connected to a high-power CW (continuous wave) transmitter that is programmed to transmit at one or more preset frequencies at a specified power level.

For an embodiment, when the transmitter of the ground unit 250 is transmitting wireless signals, and a received signal magnitude and phase are measured at the elevation unit 260 for one full azimuth sweep and a partial vertical sweep of the high-gain antenna 214. For an embodiment, this includes an Azimuth sweep of a full 360 degrees, and/or an elevation sweep of 0-180 degrees.

For an embodiment, the elevated unit receives and measures a magnitude and phase of the wireless signals transmitted by the ground unit through N beam directions of the high-gain antenna 214 of the ground unit 250. Further, N complex receive power representations are determined, wherein each complex receive power representation includes the measured magnitude and phase of the received wireless signals corresponding with each of the N beam directions. Further, a receive power summation is determined by performing a complex summation of the N complex receive power representations.

For an embodiment, an orientation of the high-gain (for example, dish) antenna 214 is measured using a two-axis encoder and stored along with a GPS synced time-stamp. Further, for an embodiment, the magnitude and phase of the received signal from the omni-directional antenna of the elevated unit 260 is measured and stored along with a GPS synced time-stamp.

For an embodiment, the ground unit 250 transmits rather than the elevated unit 260 to reduce the burden of hosting a heavy high-power transmitter to the elevated unit 260. For an embodiment, the elevated unit 260 is a drone, which benefits from less weight. The ground unit 250 is located on the ground, and transmits wireless signals at an elevation that is substantially less than the elevation of the elevated unit. Accordingly, the heavy equipment needed for the high-gain beam transmission of the ground unit 250 is located at the lower elevation of the ground unit 250. That is, RF power measurement devices (receiver) of the elevated unit 260 are typically lower in weight than a transmitter device. The lower weight receiving device of the elevated unit 260 are more adapted (lighter) for use in a drone or some other type of aerial device.

For a least some embodiments, the measured data is then post-processed to yield path loss and angular spread in both azimuth and elevation axis. For an embodiment, the post-processing includes determining the receive power summation by performing the complex summation of the N complex receive power representations. Further, for at least some embodiments, the post-processing includes determining receive power summation by determining a power azimuth spectrum (PAS) for each of the N beam directions.

It is to be understood that the site survey configuration of FIG. 2B allows for conducting path loss measurements without the need for an existing tower infrastructure. Further, this site survey configuration provides for prediction an optimal tower height and placement location. Further, a path loss model can be predicted independent of the antenna patterns used for measurement. Therefore, a single set of measurements can be used to predict the performance of wide range of applications.

For an embodiment, the elevated unit 260 is implemented as an aerial platform (such as, a drone) that includes an omni-directional antenna. By receiving wireless signals with the omni-directional antenna, a required hovering stability is relaxed allowing a wide range of motion in twist and sway. Further, the gain of the omni-antennas is typically low (3-5 dBi), therefore the effect of a nearby transmitting (interfering) site should be minimal. Typically, drones contain an INS/GNSS (internal navigation system/Global Navigation Satellite System) which is a GNSS receiver coupled with an IMU (inertial measurement unit) for flight control and navigation. Rather than just sampling GPS timestamps, own-ship attitudes and position can also be recorded, requiring no additional hardware since the hardware is already installed and could help correct any motion disturbances.

Figure 3:
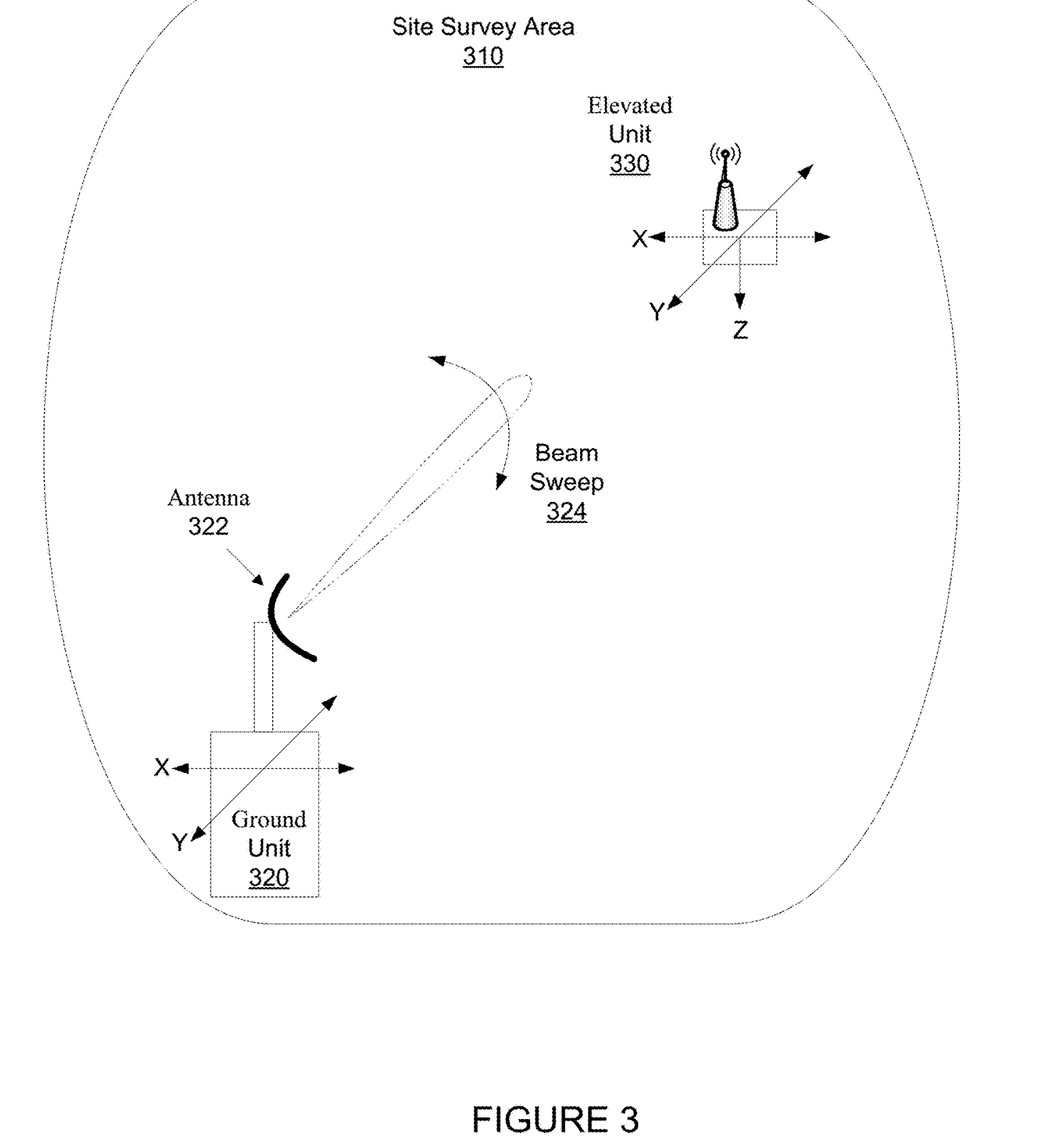
FIG. 3 shows an elevated unit and a ground unit operating to characterize a site survey area, according to an embodiment.

FIG. 3 shows an elevated unit 330 and a ground unit 320 operating to characterize a site survey area, according to an embodiment. For an embodiment, the ground unit 320 includes a directionally adjustable beam-forming antenna 322. The ground unit 320 operates to transmit or receive wireless signals while the directionally adjustable beam-forming antenna 322 changes a beam direction (for example, beam sweep 324) for a plurality of elevations of the elevated unit 330. As previously noted, for an embodiment, the ground unit 320 transmits while the elevated unit 330 receives to reduce the weight needed to support the elevated unit 330.

The site survey tool further includes the elevated unit 330. The elevated unit 330 operates to adjust to a plurality of locations (x and y coordinates). Further, for an embodiment, the elevated unit 330 operates to adjust to a plurality of heights (elevations). Further, the elevated unit 330 transmits wireless signals to the ground unit 320 or receives wireless signals from the ground unit 320 while the directionally adjustable beam-forming antenna 322 changes its beam direction. Further, the elevated unit 330 operates to adjust its height. As previously described, the elevated unit 330 may be realized using a drone.

For at least some embodiments, at least one of the ground unit 320 or the elevated unit 330 measures a signal quality of received wireless signals. For an uplink characterization, for an embodiment, the elevated unit 330 measures the signal quality. For downlink characterization, for an embodiment, the ground unit 320 measures the signal quality.

For an embodiment, a controller operates to determine complex receive power representations wherein each complex receive power representation includes the measured magnitude and phase of the received wireless signals corresponding with each of the beam directions. Further, the controller operates to determining a receive power summation comprising performing a complex summation of the N complex receive power representations.

For at least some embodiments, the controller further operates to estimate a power azimuth angular spectrum of site survey area 310 based on a known motion of the adjustable beam-forming antenna 322, a known beam-forming pattern of the adjustable beam-forming antenna 322, and measure phase and amplitude of the received wireless signals (at either the ground unit 320, and/or at the elevated unit 330). For an embodiment, the controller is a separate controller that is interfaced with the ground unit 320 and/or each of the elevated unit 330. For other embodiments, the controller in included within the ground unit 320 and/or the elevated unit 330.

For at least some embodiments, for each of a plurality of adjusted elevation settings (that is, for each of multiple settings of the Z orientation of the elevated unit 330) the ground unit 320 sweeps 324 the directionally adjustable beam-forming antenna 322 while transmitting or receiving wireless signals, and the elevated unit 330 transmits wireless signals to the ground unit 320 or receives wireless signals from the ground unit 320 for each of a plurality of locations of the ground unit 320, or locations of the elevated unit 330. The controller estimates the power azimuth angular spectrum at each of the plurality of locations of the ground unit 320 or the elevated unit 330.

As described, for a given location of the ground unit 320 or the elevated unit 330, the elevated unit 320 sets the elevation (Z orientation) of the elevated unit 330, and the ground unit 320 sweeps (changes the beam direction) the beam direction formed by the adjustable beam-forming antenna 322. For each elevation of the elevated unit 330, receive signals are measured at either the elevated unit 330 or at the ground unit 320. The elevated unit 330 then resets the elevation (Z orientation) of the elevated unit 330, and the ground unit 320 again sweeps (changes the beam direction) the beam direction formed by the adjustable beam-forming antenna 322, and the receive signal are again measured for the reset elevation of the elevated unit 330. For an embodiment, repeating this process yields received signal measurements for each location of the ground unit 320 or the elevated unit 330, for each elevation of the elevated unit 330, for each location of the of ground unit 320 or the elevated unit 330.

For at least some embodiments, the elevated unit 330 adjusts the elevation settings of the elevated unit 330 at a plurality of locations of the ground unit 320 or the elevated unit 330, and a controller estimates the power azimuth angular spectrum at each of the plurality of locations of the ground unit 320 or the elevated unit 330, for each of the plurality of locations of the ground unit ground unit 320 or the elevated unit 330.

For an embodiment, the ground unit 320 includes a dish antenna (as antenna 322) that is sweep controlled by a gimbal, and the dish antenna (gimballed dish antenna) is mounted on the elevated unit. For an embodiment, the gimballed dish antenna scans −180 to 180 (360) degrees in azimuth direction with a specified angular resolution. For an embodiment, the gimballed dish antenna scans with an elevation sweep of 180 degrees in an elevation sweep with a specified angular resolution. For an embodiment, a motor is programmed to perform the scan in a specified field of view.

For an embodiment, the ground unit 320 includes an antenna array (as antenna 322), wherein the antenna array operates to generate a beam. Further the antenna array electrically sweeps the direction of the beam. For an embodiment, the elevation unit 330 includes an omnidirectional antenna.

For an embodiment, the ground unit includes and integrated encoder that reads the look angle (direction of the beam formed by the antenna 322 of the ground unit). Further, for an embodiment, measured data (magnitude and phase) is recorded using a computer API along with the corresponding GPS (or more generally, the absolute time) time stamp on both sides (that is, at the elevated unit and at the ground unit. The data is measured using a VNA (vector network analyzer) that is preset to record absolute magnitude and phase values at a particular frequency.

For an embodiment, the site survey tool (ground unit 320, elevated unit 330) operate to characterizing an uplink channel. For an embodiment, this includes the ground unit 320 transmitting a continuous-wave single tone radio frequency signal at a preset frequency and at a preset power level while directionally adjustable beam-forming antenna 322 of the ground unit 320 is changing the beam direction. The elevated unit 330 receives and measures the phase and amplitude or the received continuous-wave single tone radio frequency signal. For a specific embodiment for characterizing the uplink, a continuous-wave single RF tone generator is programmed to transmit a preset frequency signal at a specified power level. For an embodiment, the output of the generator is connected to the antenna 322. The received signal on at the elevated unit 330 side is routed to a VNA (vector network analyzer). For an embodiment, the magnitude and phase of the received signal is measured, time-synchronized and stored using a computer API. For an embodiment, the elevated unit 330 receives and measures the phase and amplitude or the received continuous-wave single tone radio frequency signal and multiple locations within the site survey area 310.

For an embodiment, the site survey tool (ground unit 320, elevated unit 330) operates to characterizing a downlink channel. For an embodiment, this includes the elevated unit 330 transmitting a continuous-wave single tone radio frequency signal at a preset frequency and at a preset power level, and the ground unit 320 receiving and measuring phase and amplitude or the received continuous-wave single tone radio frequency signal while directionally adjustable beam-forming antenna 322 of the ground unit 320 is changing the beam direction. For a specific embodiment of characterizing the downlink, a similar RF continuous-wave single tone generator is programmed to transmit a preset frequency signal at a specified power level. For an embodiment, the output of the generator is connected to an omnidirectional antenna of the elevated unit 330. For an embodiment, the received signal on the ground unit 320 is routed to a portable VNA. For an embodiment, the magnitude and phase of the received signal is measured, time-synchronized and stored using a computer API. For an embodiment, the ground unit 320 receives and measures the phase and amplitude or the received continuous-wave single tone radio frequency signal and multiple locations within the site survey area 310

For an embodiment, the uplink and downlink characterizations can either be set to operate on two non-overlapping frequency bands (FDD) or time disciplined to operate in the same band (TDD).

For an embodiment, data generated by the receiving and measuring of the signals is repeated for several look angles (direction of the beam formed by the antenna of the ground unit 320).

Figure 4:
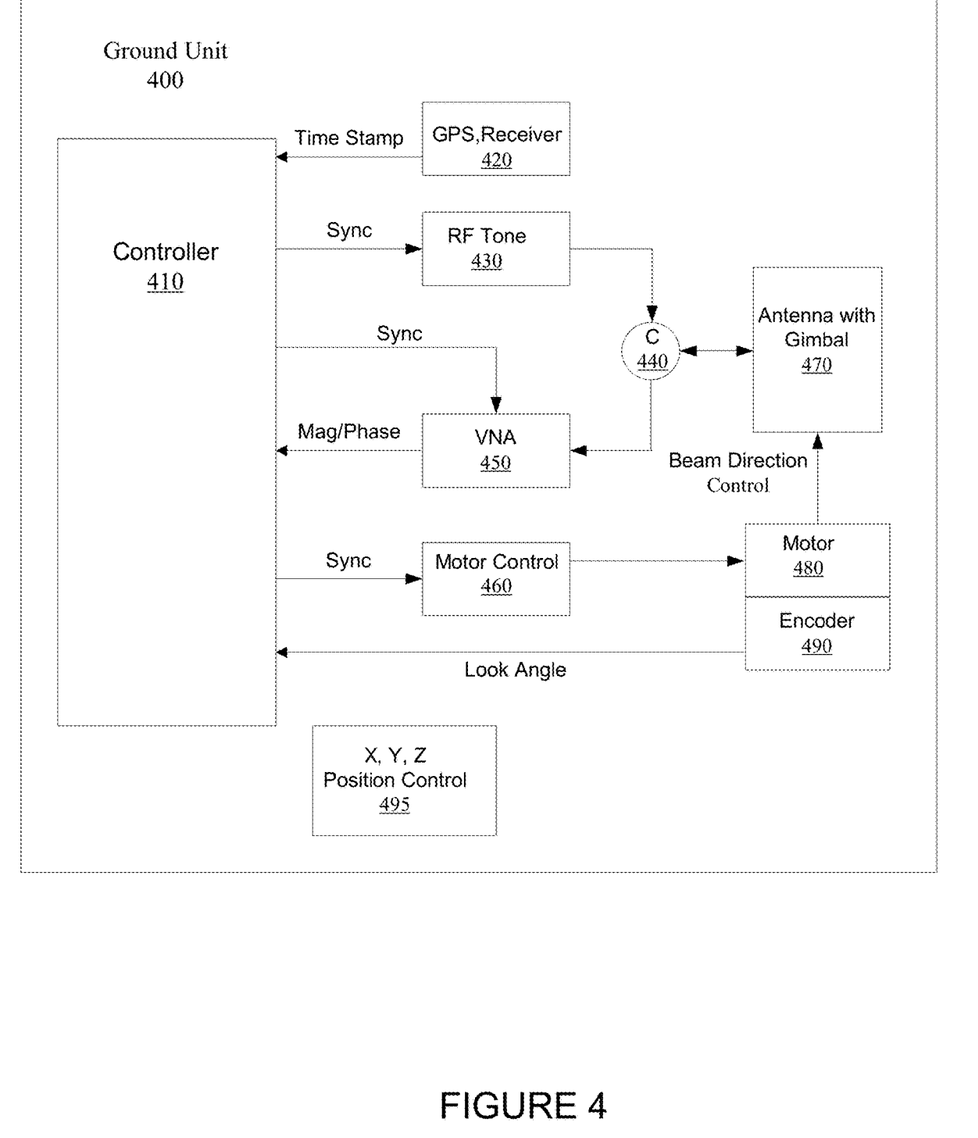
FIG. 4 shows a block diagram of a ground unit, according to an embodiment.

FIG. 4 shows a block diagram of a ground unit 400, according to an embodiment. As shown, the ground unit 400 includes an antenna with gimbal 470 which generates a beam that is adjustably directed. For an embodiment, the beam sweeps over various directions. While shown and described as a dish antenna with gimbal control, the antenna of the ground unit 400 can be implemented with other types of equivalent antennas.

For an embodiment, the beam includes a transmit signals, which is generated by an RF (radio frequency) tone source 430 and is provided to the antenna with gimbal 470 through a circulator 440. As previously described, for an embodiment, RF tone source 430 generates a continuous-wave single RF tone, and the RF tone source 430 is programmed to transmit a preset frequency signal at a specified power level.

For an embodiment, the ground unit 400 includes a GPS (global positioning system) receiver 420 in order for the ground unit 400 to determine its location, and to obtain a time stamp which allows for synchronization in post-processing. For an embodiment, a controller 410 receives the time stamp, and provides the RF tone source 430 with a sync (synchronization) signal for providing synchronization of the RF tone generated by the RF tone source 430.

For an embodiment, the sync is also provided to a motor controller 460 that controls a motor 480 that controls the direction of the beam of the antenna with gimbal 470. A ground unit then measures the phase and amplitude of a received signal. For a location and elevation of the elevated unit, and a location of the ground unit, a controller (this controller can be an external controller, or can be at least partially the controller 410) operates to estimate a power azimuth angular spectrum of a surveyed site based on a known motion of the adjustable beam-forming antenna (antenna with gimbal 470), a known beam-forming pattern of the adjustable beam-forming antenna (antenna with gimbal 470), and measurements of phase and amplitude of the received wireless signals. The sync signal, the beam direction control, and knowledge of the adjustable beam-forming antenna allow for determination of the motion of the adjustable beam-forming antenna (antenna with gimbal 470), a known beam-forming pattern of the adjustable beam-forming antenna (antenna with gimbal 470).

For an embodiment, the location and elevation of the ground unit 400 is monitored and/or controlled during the surveying of the site survey area. The ground unit 400 includes position control 495 that sets and/or monitors the location and elevation of the ground unit 400.

For an embodiment, the antenna with gimbal 470 of the ground unit 400 receives wireless signals from an elevated unit while the antenna with gimbal 470 is adjusting a direction of a beam formed by the antenna with gimbal 370. The elevated unit transmitted signals are received through the antenna with gimbal 470 and provided to a VNA (vector network analyzer) 450 through the circulator 440. The VNA 450 provides a measured magnitude and phase of the received signal to the controller 410. Again, a controller (this controller can be an external controller, or can be at least partially the controller 410) operates to estimate a power azimuth angular spectrum of a surveyed site based on a known motion of the adjustable beam-forming antenna (antenna with gimbal 470), a known beam-forming pattern of the adjustable beam-forming antenna (antenna with gimbal 470), and measure phase and amplitude of the received wireless signals.

An encoder 490 provides the controller 410 with a look angle (the angular direction of the beam formed by the directionally beam formed antenna).

As previously described, the antenna 470 is a directionally controlled beam-forming antenna that can be implemented with an antenna array that electrically controls the direction of the antenna, or with a dish antenna and gimbal as shown in FIG. 4.

Figure 5:
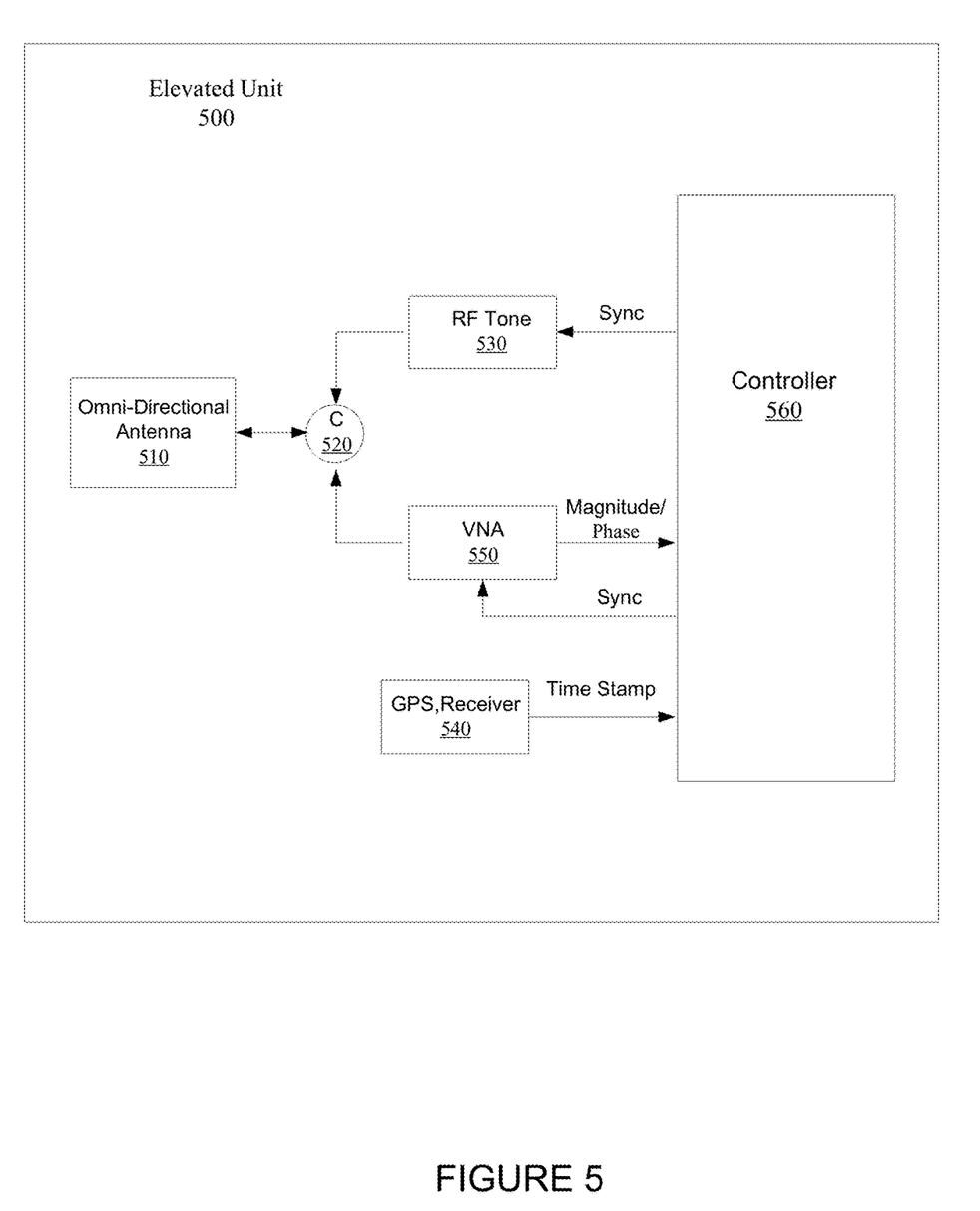
FIG. 5 shows a block diagram of an elevated unit, according to an embodiment.

FIG. 5 shows a block diagram of an elevated unit 500, according to an embodiment. For an embodiment, the elevated unit 500 includes an omni-directional antenna 510. When receiving a wireless signal from the ground unit 400, the omni-directional antenna 510 provides the received wireless signal to a VNA 550 through a circulator 520 which measures the magnitude and phase of the received signal which are provided to a controller 560. Again, a controller (this controller can be an external controller, or can be at least partially the controller 560) operates to estimate a power azimuth angular spectrum of a surveyed site based on a known motion of the adjustable beam-forming antenna (antenna with gimbal 470), a known beam-forming pattern of the adjustable beam-forming antenna (antenna with gimbal 470), and measure phase and amplitude of the received wireless signals.

For an embodiment, the elevated unit 500 includes a GPS receiver 540 for providing a location of the elevated unit 500, and for providing a time stamp. The controller 560 receives the time stamp. Utilizing the time stamp, the controller 560 provides sync signals to both the VNA 550 and an RF tone generator 530. Note that for an embodiment, both the ground unit 400 and the elevated unit 500 are synchronized to a GPS signal.

For an embodiment, the RF tone generator 530 transmits a continuous-wave single tone radio frequency signal at a preset frequency and at a preset power level, and the elevated unit 500 receives and measures phase and amplitude of the received continuous-wave single tone radio frequency signal while directionally adjustable beam-forming antenna of the ground unit 400 is changing the beam direction. Again, a controller (this controller can be an external controller, or can be at least partially the controller 560) operates to estimate a power azimuth angular spectrum of a surveyed site based on a known motion of the adjustable beam-forming antenna (antenna with gimbal 470), a known beam-forming pattern of the adjustable beam-forming antenna (antenna with gimbal 470), and measure phase and amplitude of the received wireless signals.

Figure 6:
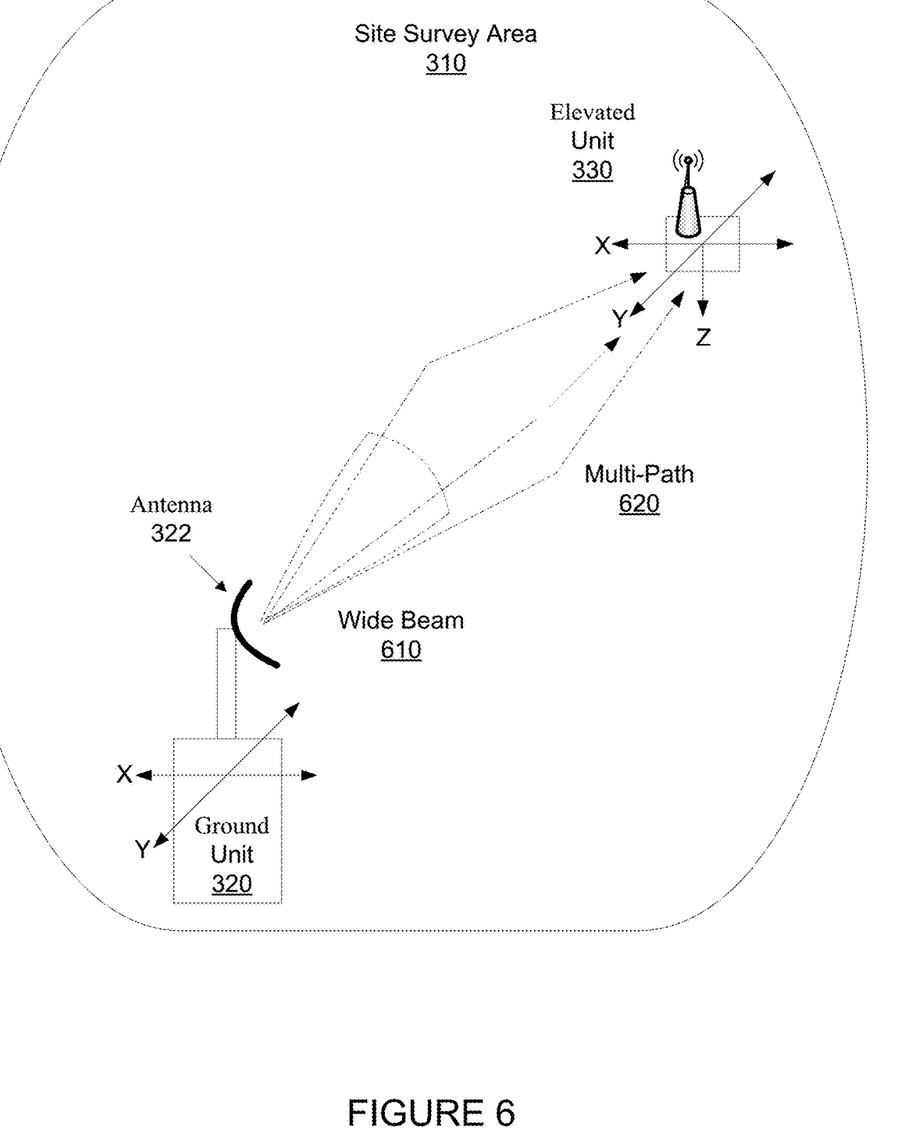
FIG. 6 shows a ground unit that includes a wide-beam wherein wireless communication between the ground unit and the elevated unit suffers from multi-path, according to an embodiment.

FIG. 6 shows a ground unit 320 that includes a wide-beam 610 wherein wireless communication between the ground unit 320 and the elevated unit 330 suffers from multi-path 620, according to an embodiment. As described, at least some embodiments include the elevated unit receiving and measuring a magnitude and phase of the wireless signals transmitted by the ground unit through the N beam directions of the high-gain antenna. Further N complex receive power representations are determined wherein each complex receive power representation includes the measured magnitude and phase of the received wireless signals corresponding with each of the N beam directions. The receive power summation is determined by performing a complex summation of the N complex receive power representations. However, if the beam formed by the high-gain antenna 322 of the ground unit 320 is not perfectly focused (as depicted in FIG. 6 by the wide beam 610) then multi-path can exist in the communication link between the ground unit 320 and the elevated unit 330.

For at least some embodiments, the multi-path in the wireless communication link between the ground unit 320 and the elevated unit 330 is accounted for in the receive power summation by determining a power azimuth spectrum (PAS) for each of the N beam directions, and performing a complex summation of the PAS of the each of the N beam directions. For an embodiment, determining the power azimuth spectrum (PAS) for each of the N beam directions includes estimating the PAS based on the known motion of the adjustable beam-forming antenna, a known beam-forming pattern of the adjustable beam-forming antenna, and the measured phase and amplitude of the received wireless signals of the one of the N beam directions. For an embodiment, this includes transforming values of the measured phase and amplitude of the received wireless signals of the one of the N beam directions and the known beam-forming pattern into a frequency domain, performing a power azimuth angular spectrum estimation in the frequency domain, and transforming the estimated power azimuth angular spectrum back to a time domain.

Figure 7A:
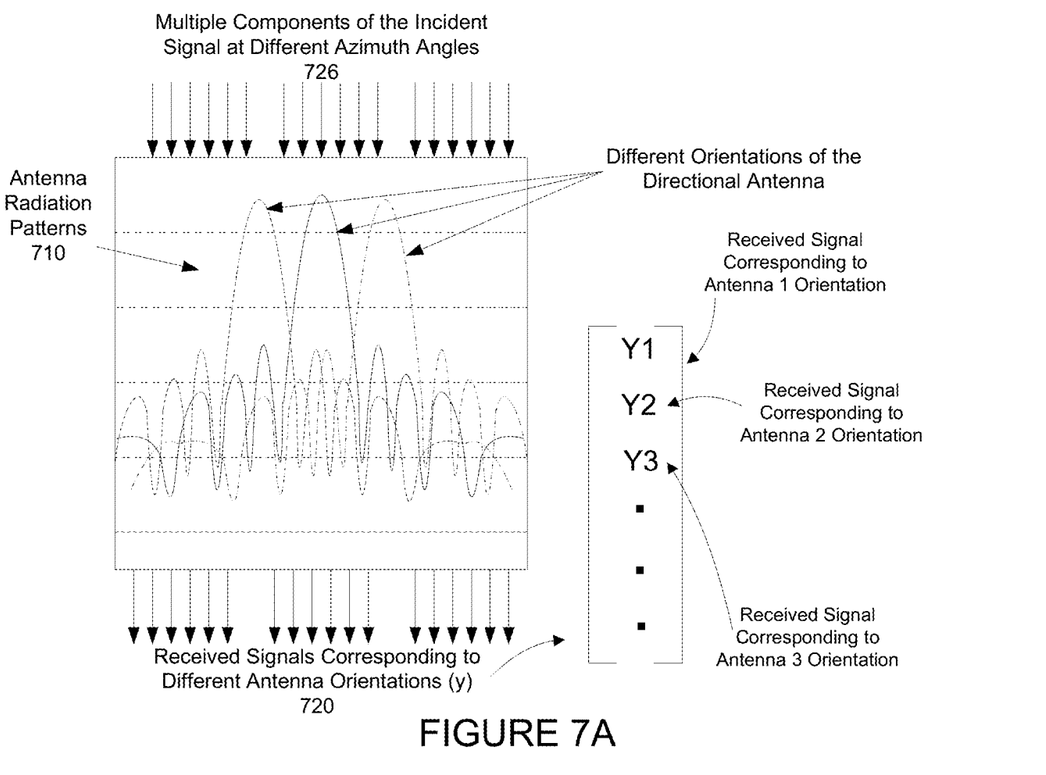
FIG. 7A shows radiation patterns of three different exemplary orientations of a directional antenna mounted on the ground unit, according to an embodiment.

FIG. 7A shows radiation patterns 710 of three different exemplary orientations of the directional antenna mounted on the ground unit, according to an embodiment. The x-axis in FIG. 7A is the azimuth angle and y-axis is the antenna gain in a given azimuth direction. FIG. 7A also shows the how the impinging rays of the receiving signal from various azimuth directions are combined by the antenna. That is, FIG. 7A includes multiple components of the incident signal at the different azimuth angles 726 (that is, the signal incident to the adjustable beam-forming antenna). The incident signals include both an amplitude and a phase. Further, the PAS (power azimuth angular spectrum) is a property of the incident signal, which needs to be determined by processing of the received signals. FIG. 7A also shows received field measurements ($y_m$) 720 which represent the incident signal 726 having been received through the beam-forming antenna and different orientations of the directional antenna. The PAS signal can be determined through known motion (based on the elements of "Y, or $y_k$) of the adjustable beam-forming antenna, the known beam-forming patterns of the adjustable beam-forming antenna, and the measured phase and amplitude of the received wireless signals (Y).

A mathematical analysis shows that power azimuth spectrum is circularly convolved with the complex antenna pattern. For the analysis, 'g' is the antenna pattern, '$\alpha_k$' and '$\theta_k$' are the resulting magnitude and phase change for the 'k'th path. '$a_{tx}$' is the transmit amplitude, '$n_m$' is the measurement noise and '$y_m$' is the measured data.

The received field measurements
$$y_m = a_{tx}\Sigma_{k=1}^{360}\alpha_k e^{j\theta_k}g_{(k-m)_{360}} + n_m = a_{tx}\Sigma_{k=1}^{360}p_k g_{(k-m)_{360}} + n_m$$

In this case, $p_k = \alpha_k e^{j\theta_k}$k can be estimated by performing frequency domain estimation. For accurate estimation of Azimuth Spectrum $a_{tx}$ needs to be sufficiently high, and a high-resolution radiation pattern and RSSI measurements should be obtained.

For at least some embodiments, based on the received power levels (of $y_m$), the pathloss can be estimated, and the PAS can be estimated. The results can be curve fitted to either a Gaussian or Laplacian model to calculate the power azimuth angular spectrum.

Figure 7B:
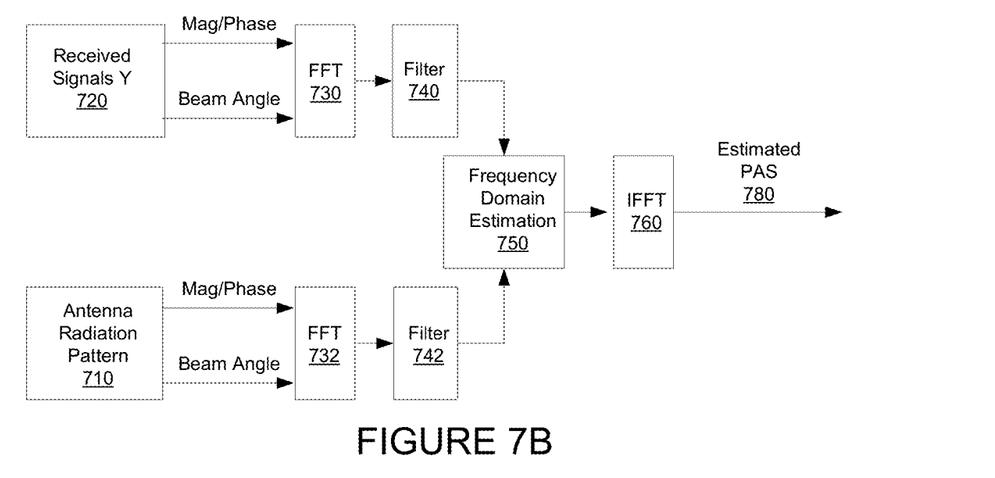
FIG. 7B shows a block diagram of processing of received signal (both magnitude and phase, $y_m$) and known antenna complex radiation pattern ($g_m$) for generating a power azimuth angular spectrum (square of modulus of $\alpha_m$), according to an embodiment.

FIG. 7B shows a block diagram of processing of received signal (both magnitude and phase, $y_k$) and known antenna complex radiation pattern ($g_k$) for generating a power azimuth angular spectrum (square of modulus of $\alpha_k$), according to an embodiment. For an embodiment, this is generated by transforming $y_k$ and $g_k$ to the frequency domain and performing a frequency domain estimation of $\alpha_k$. The transformation to frequency domain is achieved by performing a Fast Fourier Transform (FFT) operation. After the estimation, for an embodiment, the resulting frequency domain $a_k$ is transformed back to time domain by performing Inverse Fast Fourier Transform (IFFT). The square of the modulus of the resulting signal from the IFFT block yields the PAS.

The processing includes accessing the received field measurements 720 and the antenna radiation pattern 710 which both includes a magnitude, phase, and a beam angle (that is, the direction of the beam formed by the beam-forming antenna). Both the received field measurements 720 and the antenna radiation pattern 710 are converted into the frequency domain by FFT(s) (fast Fourier transforms) 730, 732. Next, FFT samples are filtered 740, 742 by removing the samples that are of a zero or near-zero value, which may be referred to as frequency domain windowing. That is, the zero samples are removed from the FFT samples of the radiation pattern, and then the corresponding samples are removed from the FFT samples of the received field measurements. Next, a frequency domain estimation 750 is performed. For an embodiment, the frequency domain estimation 750 includes dividing the measured or received samples (FFT samples) by the known antenna pattern samples (FFT samples).

For an embodiment, the frequency domain estimation is then transformed back to the time domain by performing an IFFT (inverse fast Fourier transform) 760. The resulting signal after 760 is complex valued. That is, the resulting signal after 760 has both a magnitude and a phase which represents the PAS 780. The resulting signal after 760 is complex valued having both magnitude and phase.

Figure 8:
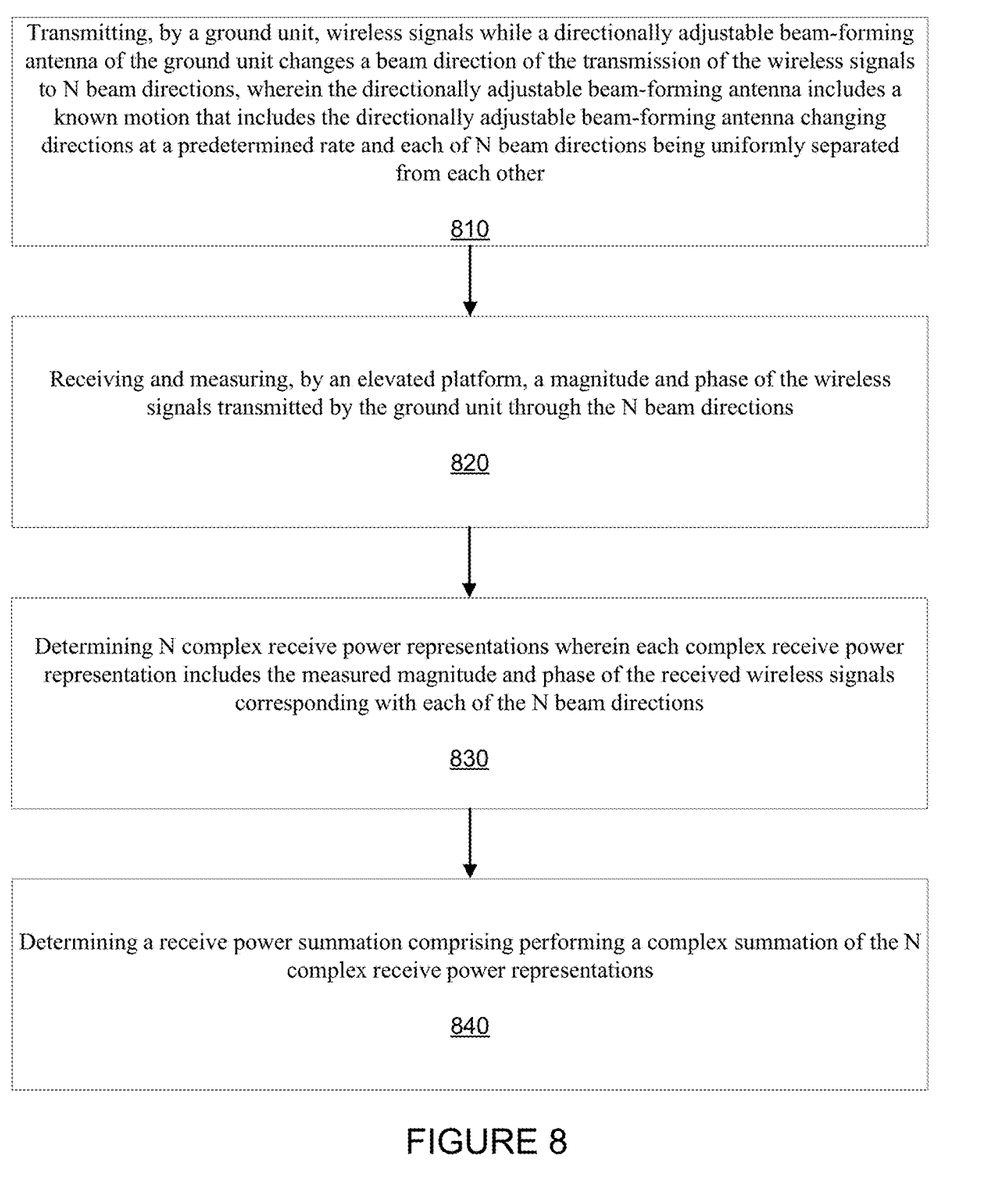
FIG. 8 is a flow chart that includes steps of a method of surveying a site for cellular base station placement, according to an embodiment.

FIG. 8 is a flow chart that includes steps of a method of surveying a site, according to an embodiment. A first step 810 includes transmitting, by a ground unit, wireless signals while a directionally adjustable beam-forming antenna of the ground unit changes a beam direction of the transmission of the wireless signals to N beam directions, wherein the directionally adjustable beam-forming antenna includes a known motion that includes the directionally adjustable beam-forming antenna changing directions at a predetermined rate and each of N beam directions being uniformly separated from each other. A second step 820 includes receiving and measuring, by an elevated unit, a magnitude and phase of the wireless signals transmitted by the ground unit through the N beam directions. A third step 830 includes determining N complex receive power representations wherein each complex receive power representation includes the measured magnitude and phase of the received wireless signals corresponding with each of the N beam directions. A fourth step 840 includes determining a receive power summation comprising performing a complex summation of the N complex receive power representations.

At least some embodiments further include designating a location of the ground unit as in-range of a base station at a location of the elevated unit if the determined receive power summation is greater than a predetermined threshold level. The locations of the elevated unit and/or the ground unit can be varied to characterize a site. That is, for an embodiment, wherein the receive power summation is determined at multiple locations of the ground unit. For an embodiment, the receive power summation is determined at multiple elevations of the elevated unit or at multiple locations of the elevation platform.

As previously described, for an embodiment, the directionally adjustable beam-forming antenna of the ground unit changes a beam direction of the transmission of the wireless signals over a full azimuth sweep of 360 degrees. Further, as previously described, for an embodiment, the directionally adjustable beam-forming antenna of the ground unit changes a beam direction of the transmission of the wireless signals over an elevation sweep of 180 degrees.

As previously described, for an embodiment, wherein the elevated unit includes an omni-directional antenna. As previously described, for an embodiment, the directionally adjustable beam-forming antenna of the ground unit comprises a dish antenna.

As previously described, for an embodiment, determining the receive power summation further includes determining a power azimuth spectrum (PAS) for each of the N beam directions, including for each one of the N beam directions, estimating the PAS for based on the known motion of the adjustable beam-forming antenna, a known beam-forming pattern of the adjustable beam-forming antenna, and the measured phase and amplitude of the received wireless signals of the one of the N beam directions. For an embodiment, this includes transforming values of the measured phase and amplitude of the received wireless signals of the one of the N beam directions and the known beam-forming pattern into a frequency domain, performing a power azimuth angular spectrum estimation in the frequency domain, and transforming the estimated power azimuth angular spectrum back to a time domain.

At least some embodiments further include performing a complex summation of the PAS of the each of the N beam directions.

For at least some embodiments, performing the power azimuth angular spectrum estimation in the frequency domain includes removing frequency domain samples of the known beam-forming pattern having zero values, removing frequency domain samples of the measured phase and amplitude of the received wireless signals that correspond with the removed frequency domain samples of the known beam-forming pattern, dividing the frequency domain samples of the measured phase and amplitude of the received wireless signals with the frequency domain samples of the known beam-forming pattern for a frequency bin of each sample after removing the frequency domain samples.

For at least some embodiments, estimating the power azimuth angular spectrum of the surveyed site based on the known motion of the adjustable beam-forming antenna, the known beam-forming pattern of the adjustable beam-forming antenna, and the measured phase and amplitude of the received wireless signals includes estimating the power azimuth angular spectrum, including determining an FFT (fast Fourier transform) of the measured phase and amplitude of the received wireless signals, determining an FFT of an antenna radiation pattern of the adjustable beam-forming antenna, frequency domain windowing the FFT of the measured phase and amplitude of the received wireless signals, frequency domain windowing the FFT of an antenna radiation pattern of the adjustable beam-forming antenna, frequency domain estimating the frequency domain windowing the FFT of the measured phase and amplitude and the frequency domain windowing the FFT of an antenna radiation pattern, and determining and IFFT (inverse fast Fourier transform) of the frequency domain estimate.

Although specific embodiments have been described and illustrated, the embodiments are not to be limited to the specific forms or arrangements of parts so described and illustrated. The described embodiments are to only be limited by the claims.

What is claimed:

1. A method of surveying a site, comprising:
transmitting, by a ground unit, wireless signals while a directionally adjustable beam-forming antenna of the ground unit changes a beam direction of the transmission of the wireless signals to N beam directions, wherein the directionally adjustable beam-forming antenna includes a known motion that includes the directionally adjustable beam-forming antenna changing directions at a predetermined rate and each of N beam directions being uniformly separated from each other;
receiving and measuring, by an elevated unit, a magnitude and phase of the wireless signals transmitted by the ground unit through the N beam directions;
determining N complex receive power representations wherein each complex receive power representation includes the measured magnitude and phase of the received wireless signals corresponding with each of the N beam directions; and
determining a receive power summation comprising performing a complex summation of the N complex receive power representations.

2. The method of claim 1, further comprising designating a location of the ground unit as in-range of a base station at a location of the elevated unit if the determined receive power summation is greater than a predetermined threshold level.

3. The method of claim 1, wherein the elevated unit includes an omni-directional antenna.

4. The method of claim 1, wherein the receive power summation is determined at multiple locations of the ground unit.

5. The method of claim 1, wherein the receive power summation is determined at multiple elevations of the elevated unit or at multiple locations of the elevation platform.

6. The method of claim 1, wherein the directionally adjustable beam-forming antenna of the ground unit changes a beam direction of the transmission of the wireless signals over a full azimuth sweep of 360 degrees.

7. The method of claim 1, wherein the directionally adjustable beam-forming antenna of the ground unit changes a beam direction of the transmission of the wireless signals over an elevation sweep of 180 degrees.

8. The method of claim 1, wherein the directionally adjustable beam-forming antenna of the ground unit comprises a dish antenna.

9. The method of claim 1, wherein determining the receive power summation further comprises determining a power azimuth spectrum (PAS) for each of the N beam directions, comprising for each one of the N beam directions:

estimating the PAS based on the known motion of the adjustable beam-forming antenna, a known beam-forming pattern of the adjustable beam-forming antenna, and the measured phase and amplitude of the received wireless signals of the one of the N beam directions comprising:

transforming values of the measured phase and amplitude of the received wireless signals of the one of the N beam directions and the known beam-forming pattern into a frequency domain;

performing a power azimuth angular spectrum estimation in the frequency domain; and transforming the estimated power azimuth angular spectrum back to a time domain.

10. The method of claim 9, further comprising performing a complex summation of the PAS of the each of the N beam directions.

11. The method of claim 9, wherein performing the power azimuth angular spectrum estimation in the frequency domain, comprises:

removing frequency domain samples of the known beam-forming pattern having zero values;

removing frequency domain samples of the measured phase and amplitude of the received wireless signals that correspond with the removed frequency domain samples of the known beam-forming pattern;

dividing the frequency domain samples of the measured phase and amplitude of the received wireless signals with the frequency domain samples of the known beam-forming pattern for a frequency bin of each sample after removing the frequency domain samples.

12. The method of claim 9, wherein estimating the power azimuth angular spectrum of the surveyed site based on the known motion of the adjustable beam-forming antenna, the known beam-forming pattern of the adjustable beam-forming antenna, and the measured phase and amplitude of the received wireless signals comprises:

estimating the power azimuth angular spectrum, comprising:

determining an FFT (fast Fourier transform) of the measured phase and amplitude of the received wireless signals;

determining an FFT of an antenna radiation pattern of the adjustable beam-forming antenna;

frequency domain windowing the FFT of the measured phase and amplitude of the received wireless signals;

frequency domain windowing the FFT of an antenna radiation pattern of the adjustable beam-forming antenna;

frequency domain estimating the frequency domain windowing the FFT of the measured phase and amplitude and the frequency domain windowing the FFT of an antenna radiation pattern; and determining and IFFT (inverse fast Fourier transform) of the frequency domain estimate.

13. A site survey tool, comprising:

a ground unit operating to transmit wireless signals while a directionally adjustable beam-forming antenna of the ground unit changes a beam direction of the transmission of the wireless signals to N beam directions, wherein the directionally adjustable beam-forming antenna includes a known motion that includes the directionally adjustable beam-forming antenna changing directions at a predetermined rate and each of N beam directions being uniformly separated from each other;

an elevated unit operating to receive and measure a magnitude and phase of the wireless signals transmitted by the ground unit through the N beam directions;

a controller operating to:

determine N complex receive power representations wherein each complex receive power representation includes the measured magnitude and phase of the received wireless signals corresponding with each of the N beam directions;

determine a receive power summation comprising performing a complex summation of the N complex receive power representations.

14. The site survey tool of claim 13, wherein the controller is further operative to designate a location of the ground unit as in-range of a base station at a location of the elevated unit if the determined receive power summation is greater than a predetermined threshold level.

15. The site survey tool of claim 13, wherein the receive power summation is determined at multiple locations of the ground unit.

16. The site survey tool of claim 13, wherein the receive power summation is determined at multiple elevations of the elevated unit or at multiple locations of the elevation platform.

17. The site survey tool of claim 13, wherein determining the receive power summation further comprises determining a power azimuth spectrum (PAS) for each of the N beam directions, comprising for each one of the N beam directions, the controller operating to:

estimate the PAS based on the known motion of the adjustable beam-forming antenna, a known beam-forming pattern of the adjustable beam-forming antenna, and the measured phase and amplitude of the received wireless signals of the one of the N beam directions comprising:

transform values of the measured phase and amplitude of the received wireless signals of the one of the N beam directions and the known beam-forming pattern into a frequency domain;

perform a power azimuth angular spectrum estimation in the frequency domain; and transform the estimated power azimuth angular spectrum back to a time domain.

18. The site survey tool of claim 17, wherein the controller further operates to perform a complex summation of the PAS of the each of the N beam directions.

19. The site survey tool of claim 17, wherein performing the power azimuth angular spectrum estimation in the frequency domain, comprises the controller operating to:

remove frequency domain samples of the known beam-forming pattern having zero values;

remove frequency domain samples of the measured phase and amplitude of the received wireless signals that correspond with the removed frequency domain samples of the known beam-forming pattern;

divide the frequency domain samples of the measured phase and amplitude of the received wireless signals with the frequency domain samples of the known beam-forming pattern for a frequency bin of each sample after removing the frequency domain samples.

20. The site survey tool of claim 17, wherein estimating the power azimuth angular spectrum of the surveyed site based on the known motion of the adjustable beam-forming antenna, the known beam-forming pattern of the adjustable beam-forming antenna, and the measured phase and amplitude of the received wireless signals comprises the controller operating to:

estimate the power azimuth angular spectrum, comprising:
- determining an FFT (fast Fourier transform) of the measured phase and amplitude of the received wireless signals;
- determining an FFT of an antenna radiation pattern of the adjustable beam-forming antenna;
- frequency domain windowing the FFT of the measured phase and amplitude of the received wireless signals;
- frequency domain windowing the FFT of an antenna radiation pattern of the adjustable beam-forming antenna;
- frequency domain estimating the frequency domain windowing the FFT of the measured phase and amplitude and the frequency domain windowing the FFT of an antenna radiation pattern; and
- determining and IFFT (inverse fast Fourier transform) of the frequency domain estimate.

\* \* \* \* \*